Figure 1:
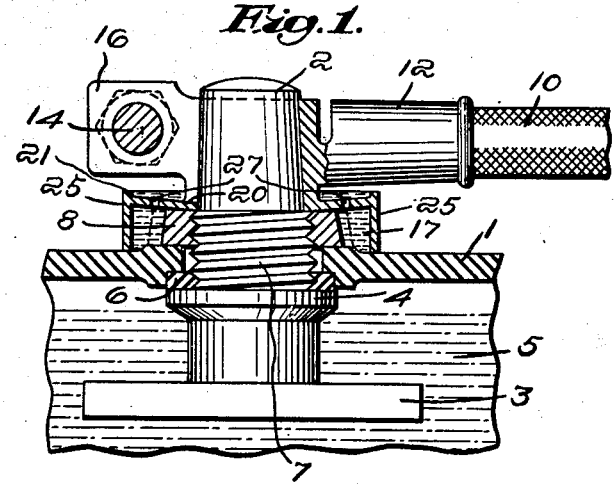

Patented Nov. 25, 1941

2,264,188

UNITED STATES PATENT OFFICE 2,264,188

SEALING BATTERY TERMINAL

Joseph John Paterno, Salem, Mass.

Original application July 30, 1940, Serial No. 348,380. Divided and this application April 1, 1941, Serial No. 386,270

1 Claim. (Cl. 173—259)

My present invention relates to storage batteries, and more particularly to a protecting and sealing device carried by the battery cables, which device is automatically effective on the battery terminal post when the cable is attached.

This application is a divisional of my prior and copending application Ser. No. 348,380, filed July 30, 1940, now U. S. Letters Patent No. 2,237,630 dated April 8, 1941.

As fully explained in my said prior application, it has heretofore been difficult to prevent corrosion of battery terminals and connections from storage batteries, particularly those used in automobiles, which are under constant agitation and vibration and are exposed to weather conditions, so that the acid from the battery is liable to leak out by the terminals and corrode the cable connections.

My present invention is directed to a simple and efficient sealing and protecting device to prevent such corrosion and to seal the opening from the battery thru which the terminal post projects, such sealing device being carried by and attached to the terminal clamp on the cable to be attached to the post. Thus, as the cable is applied to and clamped upon a terminal post of a battery, my invention provides means carried by said clamp to automatically effect and complete the sealing operation.

In my said prior and copending application, I have claimed the protecting and sealing construction broadly as carried by a device adapted to fit on the battery terminal; and in the present application I have claimed the invention as carried by the connecting cable and its clamp.

Figure 2:
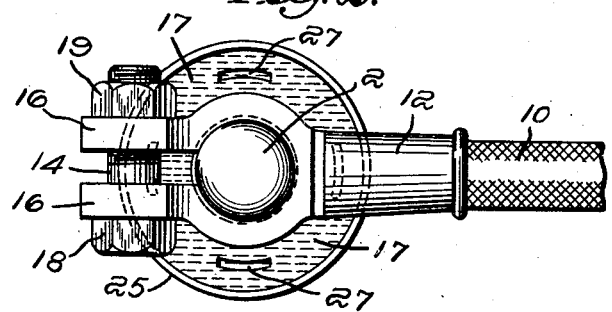

Referring to the drawing illustrating a preferred embodiment of the present invention:

Fig. 1 is a view partly in cross-section of the clamp and sealing member attached to the terminal post, and Fig. 2 is a plan view of my cable terminal clamp and sealing device carried thereby.

As shown in the drawing, a casing 1 is indicated for a typical storage battery, and projecting thru an opening in the casing 1 is a terminal post 2 extending from one of the cells indicated at 3 within the casing, said casing containing an electrolite 5. The post 2 has a shouldered portion 4 of greater diameter than the opening thru the casing, and adapted to be in engagement with a gasket 6 between the shoulder and the inner surface of the casing 1 to provide a relatively tight joint.

The post 2 is threaded at its lower portion to receive a clamping nut 8 which thus holds the post 2 in assembled position with the casing 1. The upper part of the post 2 is adapted to be engaged by the terminal clamp carried by the electric cable 10, said clamp 12 being fitted on the end of the cable and comprising a split-ring clamping portion adapted to encircle the post 2 and adapted to be held by a bolt 14 passing thru openings in the outer end 16—16 of the clamp, said bolt having a head 18 and a nut 19 to be tightened against the outer end 16 to effect the clamping action.

My present invention contemplates the formation of the clamp 12 with a grease-carrying receptacle adapted to hold and carry a quantity of grease 17, which will effect a sealing and protecting action around the opening thru which the post 2 emerges from the casing 1, as electrolite escapes thru this opening in spite of the gasket 6 and clamping nut 8.

My grease-holding terminal construction, preferably, comprises an integral grease-holding member 25 of greater depth than that of the nut 8 and of greater diameter, so that as the clamp 12 is fitted on the post 2 the walls of the member 25 will abut against the top of the casing 1 and leave a substantial area within the member 25 to retain a quantity of grease 17, as best illustrated in Fig. 1.

This member 25, preferably, is formed with a web 20 intermediate the height of the member 25, leaving a ridge 21 above said web so as to also receive and hold a quantity of grease 17 above said web and within the confines of the rim 21. A plurality of openings 27 thru the web 20 permits grease to be applied on the top of the web and to be forced or to flow thru the openings 27, thus filling the interior between the nut 8 and the outer walls of the member 25, while effecting a retaining and protecting receptacle for the grease 17 therein.

By my present invention, the simple application of applying the clamp to the post, either with the grease 17 filling the member 25 before or after such clamping application, the sealing and protecting operation is completed. Preferably, I form the web 20 somewhat dished so that the grease applied on top of the same will flow into and thru the openings 27. The normal heat from the battery when in service aids in maintaining the grease in sealing condition and protects the clamp and terminal from corrosion by escaping gases from the electrolite within the battery.

I claim:

A cable having a clamp adapted to be attached to a terminal post of a battery, said clamp having a grease-holding and protecting receptacle for sealing the battery opening about said terminal post, said receptacle being in the form of a hollow member to encircle the battery post comprising a laterally extending web portion and a downwardly extending rim portion adapted to contain a quantity of grease therein, the web extending annularly around said post and forming a part of the grease-holding receptacle, said web having a plurality of openings therethru, whereby grease may be applied to the interior of the receptacle from the upper side of said web without removing the cable clamp.

JOSEPH JOHN PATERNO.